United States Patent [19]

Kuropka

[11] Patent Number: 5,705,553
[45] Date of Patent: Jan. 6, 1998

[54] COPOLYMERS CONTAINING CARBOXYL GROUPS IN AQUEOUS DISPERSION FORM OR REDISPERSIBLE POWDER FORM AND THEIR WATER-SOLUBLE SALTS, PROCESSES FOR THEIR PREPARATION AND THEIR USE AS THICKENERS IN AQUEOUS FORMULATIONS

[75] Inventor: Rolf Kuropka, Bad Soden, Germany

[73] Assignee: Hoechst Aktiengesellschaft, Germany

[21] Appl. No.: 555,878

[22] Filed: Nov. 13, 1995

Related U.S. Application Data

[63] Continuation-in-part of Ser. No. 250,441, May 27, 1994, abandoned.

[30] Foreign Application Priority Data

May 29, 1993 [DE] Germany .................. 43 18 033.7

[51] Int. Cl.$^6$ ............................................. C08F 2/16
[52] U.S. Cl. .................. 524/459; 523/122; 523/130; 524/3; 524/4; 524/5; 524/43; 524/44; 524/45; 524/436; 524/457; 524/458; 524/500; 524/501; 524/503; 524/504; 524/516; 525/54.23; 525/54.3; 525/56; 525/57; 525/58; 525/59; 525/72; 525/73; 525/64; 525/283; 526/201; 526/202
[58] Field of Search .................. 524/458, 459, 524/503, 504, 516, 3, 4, 5, 43, 44, 45, 457, 500, 501, 436; 525/54.23, 57, 58, 59, 72, 73, 64, 283, 54.3, 56; 526/201, 202; 523/122, 130

[56] References Cited

U.S. PATENT DOCUMENTS

| | | | |
|---|---|---|---|
| 3,876,596 | 4/1975 | Grubert et al. | 524/459 |
| 4,380,600 | 4/1983 | Hosoda et al. | 524/469 X |
| 5,100,949 | 3/1992 | Takahashi et al. | 524/503 X |

*Primary Examiner*—Judy M. Reddick
*Attorney, Agent, or Firm*—Bierman, Muserlian and Lucas LLP

[57] ABSTRACT

Copolymers containing carboxyl groups in aqueous dispersion form or redispersible powder form and their water-soluble salts, based on ethylenically unsaturated and copolymerizable monomers, the macro-molecules of which contain at least 24% by weight of monomer units carrying carboxyl groups prepared, by emulsion copolymerization initiated by free radicals in the presence of polyvinyl alcohol (PVA) or polyvinylpyrrolidone (PVP) dissolved in the aqueous phase and isolation of the copolymers in aqueous dispersion form, and optionally subsequent removal of water by spray drying to obtain redispersible copolymer powders and processes for their preparation and their use as thickeners in aqueous formulations which copolymers, by conversion into their water-soluble salt forms, are useful as thickening agents having a surprisingly advantageous rheology-modifying action in aqueous systems.

13 Claims, No Drawings

COPOLYMERS CONTAINING CARBOXYL GROUPS IN AQUEOUS DISPERSION FORM OR REDISPERSIBLE POWDER FORM AND THEIR WATER-SOLUBLE SALTS, PROCESSES FOR THEIR PREPARATION AND THEIR USE AS THICKENERS IN AQUEOUS FORMULATIONS

PRIOR APPLICATION

This application is a continuation-in-part of U.S. patent application Ser. No. 250,441 filed May 27, 1994 now abandoned.

The invention relates to copolymers, and to processes for their preparation, based on ethylenically unsaturated monomers which are capable of free radical copolymerization, the macromolecules of which contain at least 24% by weight, preferably at least 25% by weight, of monomer units carrying carboxyl groups and have been prepared in aqueous dispersion form by emulsion copolymerization initiated by free radicals, co-using water-soluble polyvinyl alcohol (PVA) or polyvinylpyrrolidone (PVP), and if appropriate have then been isolated as a redispersible copolymer powder by removal of water, preferably by spray drying, and to the use of the copolymers, with conversion into their water-soluble salt form, as thickeners having a surprisingly advantageous rheology-modifying action in aqueous systems.

STATE OF THE ART

It is known that copolymers based on (meth)acrylic acid esters/(meth)acrylic acid can be employed in the form of their water-soluble salts as thickeners in aqueous systems (cf., for example, R. N. Hildred, Polym. Paint Colour Journal 1990, Vol. 180, pages 579 to 583). A preferred preparation process for these copolymers is emulsion polymerization at low pH values, in which the products are in general obtained as aqueous lattices in their acid form and can then be converted into a water-soluble salt form by neutralization. The swelling and solubility properties of the aqueous lattices during the neutralization and the associated thickening effect are greatly influenced by the content of monomer units carrying carboxyl groups in the copolymers and by the property features of the other comonomers units. The rule generally applies here that the swelling properties and therefore the thickener action of the dispersion copolymers are better, the lower their glass transition temperature ($T_g$) and the higher their hydrophilicity. Copolymers which are known to have advantageous thickener properties and are preferred in this respect are built up on the basis of ethyl acrylate in copolymeric combination with methacrylic acid. However, a great disadvantage of ethyl acrylate is that, in its monomer form, it has a very low odor threshold (about 0.0005 ppm, comparable with ethylmercaptan) and a markedly unpleasant smell, which can lead to considerable environmental problems and to harmful effects on humans during its use as a monomer in aqueous latex dispersions both during preparation and during processing of the dispersions. Last but not least, for ecological reasons there is therefore an urgent need to switch to other comonomer combinations which do not have these disadvantages, such as, for example, methyl methacrylate and methacrylic acid. Although thickeners of copolymers based on methyl methacrylate and methacrylic acid are likewise known, they have very poor swelling properties, inter alia because of their high $T_g$, on neutralization of their acid form with alkalis.

Poor swelling properties of the copolymers often lead to an unsatisfactory rheology-modifying action during use.

Another disadvantage of thickener copolymers based on methyl methacrylate/methacrylic acid is the occurrence of the so-called Weissenberg effect. If concentrated acid thickener dispersions are neutralized, while stirring, the thickener solution formed is drawn up the stirrer shaft, with gel formation, if the copolymer has poor swelling properties. Further processing of such thickener solutions is then no longer possible.

OBJECTS OF THE INVENTION

The invention was therefore based on the object of rendering available as thickeners for aqueous systems those copolymers which can form, in their acid form, stable aqueous dispersions and if appropriate water-dispersible dry powders which show good swelling properties without a Weissenberg effect on neutralization in aqueous systems, the copolymers being obtainable in aqueous dispersion form by emulsion copolymerization on the basis of (meth)acrylic acid esters/(meth)acrylic acid, if appropriate preferably also without the co-use of ethyl acrylate, which presents odor problems, and having no properties which adversely affect the environment.

THE INVENTION

It has now been found, surprisingly, that dispersion copolymers of the desired type which are suitable as thickeners can be obtained if copolymerizable monomers of ethylenically unsaturated carboxylic acids or ethylenically unsaturated carboxylic acid anhydrides are subjected to free radical copolymerization with methacrylic acid esters or acrylic acid esters of aliphatic ($C_1$–$C_{22}$)-alcohols in an aqueous medium in the presence of polyvinyl alcohol (PVA) or polyvinylpyrrolidone (PVP) in mixing ratios such that the resulting copolymer contains at least 24% by weight of monomer units carrying carboxyl groups, based on the copolymer, and can be obtained in its acid form as a stable aqueous dispersion, from which the thickener copolymer can also be isolated, if appropriate, in a dry, redispersible powder form by removal of water.

The marked viscosity-increasing properties and the good swelling properties of water-soluble copolymer salts according to the invention in aqueous systems is surprising and could not be deduced from the prior art. Thus, copolymers based on ($C_1$–$C_8$)-alkyl acrylates and ethylenically unsaturated carboxylic acids and their preparation by emulsion or solution copolymerization initiated by free radicals in the presence of polyvinyl alcohol are known from EP 0 450 437 A2, the resulting copolymers containing 5 to 20% by weight of monomer units carrying carboxyl groups and 2 to 60% by weight of polyvinyl alcohol. These copolymers evidently cannot form stable aqueous dispersions during preparation by emulsion copolymerization in their acid form, and in the embodiment examples are converted partly or completely into water-soluble salt forms by addition of bases at 50° to 85° C. immediately after their preparation, and are used exclusively as sizing agents, where they advantageously show no tendency to blocking on sized filament threads. Another considerable advantage of these copolymers obtainable in the acid form during the emulsion polymerization, as seen in the EP publication, is that they do not cause a large increase in viscosity during neutralization with alkalis, alkaline earths or ammonia in aqueous media and therefore show no substantial thickening action, which is regarded as particularly advantageous for their use as sizing agents.

The invention therefore relates to copolymers based on ethylenically unsaturated monomers which can undergo free radical copolymerization, the macromolecules of which contain monomer units carrying carboxyl groups and have been prepared by emulsion copolymerization initiated by free radicals, co-using water-soluble polyvinyl alcohol (PVA) or other water-soluble organic protective colloids, and are in an aqueous dispersion form having a solids content of preferably 10 to 50% by weight, in particular 20 to 40% by weight, or in dried redispersible powder form, it also being possible for some or all of the carboxyl groups of the copolymers to be converted into a water-soluble salt form, in which they can display a thickening and rheology-modifying action in aqueous media, wherein they contain, in each case based on the copolymer, a) 0.1 to 25% by weight, preferably 5 to 15% by weight, of constituents comprising water-soluble polyvinyl alcohol (PVA), which can contain polymeric side chains formed by grafting polymerization during the copolymer formation, or mixtures of at least 50% by weight, preferably at least 60% by weight, based on the mixture, of water-soluble PVA which can contain polymeric side chains formed by grafting polymerization, and one or more of the components mentioned below under 1) to 4), i.e.

1) water-soluble modified cellulose, preferably from the group comprising hydroxyethylcellulose, carboxymethylcellulose, carboxymethylhydroxyethylcellulose and methylhydroxyethylcellulose, or 2) water-soluble polymers of N-vinylamide compounds, preferably polyvinylpyrrolidone (PVP), which can contain polymeric side chains formed by graft polymerization during the copolymer formation, or 3) water-soluble polymeric, copolymeric or block copolymeric polyalkylene oxides, preferably of ethylene oxide and/or of propylene oxide, or 4) water-soluble polyvinyl alcohols modified by isocyanate compounds or acetoacetoxylated, or $a_1$) instead of component a), 0.1 to 25% by weight, preferably 5 to 15% by weight, of constituents comprising water-soluble polyvinylpyrrolidone (PVP), which can contain polymeric side chains formed by graft polymerization during the copolymer formation, and b) 24 to 98.9% by weight, preferably about 25 to 64% by weight, of monomer units comprising ethylenically unsaturated monomers carrying carboxyl groups, and c) 1 to 78.9% by weight, preferably 30 to 69% by weight, of monomer units comprising methacrylic acid esters or acrylic acid esters of aliphatic ($C_1$–$C_{22}$)-alcohols, and d) 0 to 40% by weight, preferably 0.1 to 20% by weight, of monomer units comprising ethylenically unsaturated comonomers which differ from the abovementioned components b) and c), preferably ($C_3$–$C_{24}$)-vinyl esters, vinylaromatics, ethylenically unsaturated nitriles, ethylenically unsaturated monocarboxylic acid ($C_1$–$C_{22}$)-alkyl esters or dicarboxylic acid di-($C_1$–$C_{22}$)-alkyl esters, ethylenically unsaturated sulfonic acids or sulfonic acid derivatives, and e) 0 to 25% by weight, preferably 0.1 to 15% by weight, of monomer units comprising ethylenically unsaturated surface-active comonomers, preferably surface-active crotonic acid esters, and f) 0 to 5% by weight, preferably 0.01 to 2% by weight, of monomer units comprising polyethylenically unsaturated comonomers, preferably from the group comprising divinylbenzene, diallyl phthalate, and butanediol dimethacrylate, and g) 0 to 5% by weight, preferably 0.1 to 1.5% by weight, of molecular weight regulators, preferably from the group comprising dodecylmercaptan, thiophenol derivatives, tetrakismercaptoacetylpentaerythritol, carbon tetrachloride and bromotrichloromethane, and the copolymers, in their acid form or in their partial salt form, are in the form of aqueous latex dispersions or dried redispersible powders, or, in their water-soluble partial or complete salt form, are in the form of aqueous solutions or aqueous gels or dried water-soluble powders.

The copolymers are preferably in their acid form or in a form which is water-soluble or colloidally dispersible in water and partly or completely neutralized with alkali metal, alkaline earth metal or ammonium bases, in particular as the sodium salts, potassium salts, ammonium salts or morpholine salts.

The invention furthermore relates to a process for the preparation of the copolymers described above by free radical emulsion copolymerization of ethylenically unsaturated copolymerizable compounds in an aqueous medium at a temperature of preferably 5° to 100° C., in particular 50° to 90° C., co-using water-soluble polyvinyl alcohol (PVA) or other water-soluble organic protective colloids dissolved in the aqueous medium initially introduced into the reaction vessel, in the presence of polymerization initiators which form free radicals, emulsifiers, if appropriate further protective colloids and if appropriate molecular weight regulators, and if appropriate subsequent partial or complete neutralization of the free acid groups of the copolymers and isolation of the copolymers as aqueous dispersions or as aqueous solutions or, after removal of the water content, as water-dispersible or water-soluble powders, which comprises employing the starting compounds in the following amounts, in each case based on the total amount of starting components without the water content, and in particular a) 0.1 to 25% by weight, preferably 5 to 15% by weight, of water-soluble polyvinyl alcohol (PVA) or mixtures of at least 50% by weight, preferably at least 60% by weight, based on the mixture, of water-soluble PVA and one or more of the components mentioned below under 1) to 4), i.e.

1) water-soluble modified cellulose, preferably from the group comprising hydroxyethylcellulose, carboxymethylcellulose, carboxymethylhydroxyethylcellulose and methylhydroxyethylcellulose, or 2) water-soluble polymers of N-vinylamide compounds, preferably polyvinylpyrrolidone (PVP), or 3) water-soluble polymeric, copolymeric or block copolymeric polyalkylene oxides, preferably of ethylene oxide and/or of propylene oxide, or 4) water-soluble polyvinyl alcohols modified by isocyanate compounds or acetoacetylated, dissolved in the aqueous medium used as the initial mixture, preferably as 0.5 to 15% strength by weight, in particular 1.5 to 10% strength by weight, aqueous solutions or $a_1$) instead of component a), 0.1 to 25% by weight, preferably 5 to 15% by weight, of water-soluble polyvinylpyrrolidone (PVP), dissolved in the aqueous medium used as the initial mixture, preferably as 0.5 to 15% strength by weight, in particular 1.5 to 10% strength by weight, aqueous solutions, and b) 24 to 98.9% by weight, preferably about 25 to 64% by weight, of monomers comprising ethylenically unsaturated copolymerizable compounds carrying carboxyl groups, and c) 1 to 78.9% by weight, preferably 30 to 69% by weight, of methacrylic acid esters or acrylic acid esters of aliphatic ($C_1$–$C_{22}$)-alcohols or mixtures thereof, and d) 0 to 40% by weight, preferably 0.1 to 20% by weight, of ethylenically unsaturated copolymerizable compounds which differ from the abovementioned components b) and c), preferably ($C_3$–$C_{24}$)-vinyl esters, vinylaromatics, ethylenically unsaturated nitriles, ethylenically unsaturated monocarboxylic acid ($C_1$–$C_{22}$)-alkyl esters or dicarboxylic acid di- ($C_1$–$C_{22}$) -alkyl esters or ethylenically unsaturated sulfonic acids or sulfonic acid derivatives, and e) 0 to 25% by weight, preferably 0.1 to 15% by weight, of ethylenically unsaturated copolymerizable surface-active compounds, preferably crotonic acid esters, and f) 0 to 5% by weight, preferably 0.01 to 2% by weight, of polyethylenically unsaturated copolymerizable compounds which can have a crosslinking action, preferably from the group comprising divinylbenzene, diallyl phthalate, butanediol diacrylate and butanediol dimethacrylate, and g) 0 to 5% by weight, preferably 0.1 to 1.5% by weight, of molecular weight regulators, preferably from the group comprising compounds having a molecular weight-lowering action, in particular dodecylmercaptan, thiophenol derivatives, tetrakismercaptoacetylpentaerythritol, carbon tetrachloride and bromotrichloromethane, wherein the aqueous medium a) or $a_1$) containing PVA or PVP, to which anionic and if appropriate nonionic emulsifiers and if appropriate further protective colloids and polymerization initiators which form free radicals furthermore are added, is initially introduced into a stirred reactor at the polymerization temperature, components b) to g) are metered in separately or as a mixture or as an aqueous emulsion according to the progress of the polymerization and if appropriate in several successive stages, if appropriate together with further portions of the polymerization initiators and if appropriate further emulsifier portions, it also being possible for water-soluble starting monomers to be partly or completely dissolved in the aqueous initial mixture, the copolymerization reaction is brought to completion to form an aqueous copolymer dispersion and the copolymers are isolated in their acid form as aqueous dispersions having a solids content of preferably 10 to 50% by weight, in particular 20 to 40% by weight, based on the aqueous dispersion, or if appropriate the dispersions are converted into a dry redispersible copolymer powder by removal of water, preferably by spray drying, or if appropriate the dispersion is partly or completely neutralized by addition of basic compounds, preferably alkali compounds, ammonia or morpholine, and if appropriate is converted into dry, partly or completely neutralized water-soluble or colloidally water-soluble copolymer powders by removal of water, preferably by spray drying.

The emulsion copolymerization is carried out by customary methods, preferably at temperatures of 5° to 100° C., in particular 50° to 90° C., particularly preferably at 75° to 85° C.

The customary initiators which start free radical chains, in particular water-soluble initiators, are preferably employed in amounts of 0.01 to 2% by weight, based on the total amount of all the comonomers, for initiation of the emulsion polymerization.

Initiators which are particularly suitable for this purpose are, for example, alkali metal or ammonium persulfate, $H_2O_2$, tert-butyl hydroperoxide, customary redox catalysts and 4,4'-azobis(4-cyanovaleric acid), and furthermore high-energy radiation and customary photoinitiators.

To increase the thickener capacity or for further influencing of the rheological properties and activity of dissolved copolymers according to the invention in aqueous systems, it can be advantageous in some cases for polyethylenically unsaturated monomers, preferably from the monomeric component group f) described above, to be co-used as comonomers in the copolymerization in order to achieve higher molecular weights of the copolymers. The compounds mentioned above under f) and also allyl methacrylate or ethylene glycol dimethacrylate, for example, are preferably used as such comonomers which have a crosslinking action and lead to increases in the molecular weight. The amounts employed can preferably be in a range between 0 and 5% by weight, based on the total amount of comonomers, and can be, in particular, 0.01 to 2% by weight, particularly preferably 0.1 to 0.5% by weight. During the copolymerization, the polyethylenically unsaturated comonomers can form molecular branchings and networks which, after partial or complete neutralization of the copolymer, can lead to the formation of gel structures and thus to the development of specific rheological property profiles in aqueous systems which are advantageous for some uses.

By co-using molecular weight regulators from component group g) described above during the copolymerization, the molecular weights of the copolymers can be lowered. As the molecular weights of the copolymers fall, however, the thickening action of neutralized copolymers in aqueous systems is reduced, and the viscosities of comparable aqueous solutions of partly or completely neutralized copolymers become lower as the molecular weights fall, in comparison with copolymers which have been prepared without molecular weight regulators. However, with the aid of molecular weight regulators, it is possible to improve the possibilities of harmonizing the equilibrium between the viscosity of the neutralized copolymers in aqueous systems under exposure to high and low shear stresses and to adjust the equilibrium in a controlled manner for specific uses. Although the molecular weights of copolymers according to the invention are not subject to any particular limitation, especially at the upper limit, in the lower range, however, they are preferably above 10,000 g/mol, in particular above 30,000 g/mol.

Possible regulators which have a molecular weight-lowering action in the copolymerization are in principle all compounds which have free radical-transferring properties. The compounds described above under component group g) are preferably used for this purpose. Monofunctional or polyfunctional mercaptans are particularly preferably used. Furthermore, thioglycolic acid, α-methylstyrene and toluene, for example, are also preferred. The amount of regulator employed can preferably be in the range between 0 and 5% by weight, based on the total amount of comonomers, and can be, in particular, 0.05 to 2% by weight, particularly preferably 0.1 to 1.5% by weight.

By co-using ethylenically unsaturated copolymerizable surface-active comonomers from component group e) described above during the copolymerization of copolymers or copolymer salts prepared according to the invention, the dependence of the thickening properties of the latter in aqueous systems on the shear gradient can be reduced significantly in comparison with copolymers or copolymer salts according to the invention which have been prepared without surface-active comonomers of component group e).

Possible components of group e) are preferably surface-active esters of methacrylic acid and of acrylic acid of the formulae I and II, and in particular surface-active crotonic acid esters of the formula III, in the abovementioned amounts, the radicals and indices in the formulae I, II and III in each case having the following meanings:

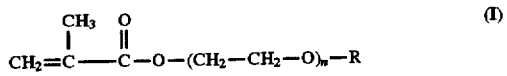

(I)

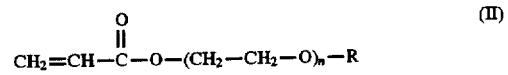

(II)

-continued $$CH_3-CH=CH-C(=O)-O-(CH_2-CH_2-O)_n-R \quad (III)$$

n=an integer from 2 to 100,

R=an aliphatic ($C_2$–$C_{30}$) radical which can be linear or branched, a mono-, di- or trialklphenyl radical with alkyl groups having in each case 4 to 12 carbon atoms, a block copolymeric radical of the formula IVa or IVb $$-(CH(CH_3)-CH_2-O)_m-(CH_2-CH_2-O)_p-R' \quad (IVa)$$

$$-(CH_2-CH(CH_3)-O)_m-(CH_2-CH_2-O)_p-R' \quad (IVb)$$

in which m is a number from 10 to 100, p is a number from 0 to 100, preferably 1 to 30, and R'=H, ($C_1$–$C_{20}$)-alkyl, phenyl, alkylphenyl having ($C_1$–$C_{20}$)-alkyl groups or a perfluorinated or partly fluorinated ($C_1$–$C_{16}$)-alkyl radical.

In some cases, it may be expedient for the surface-active comonomers of component group e) to be initially introduced into the aqueous phase in the emulsion copolymerization.

Possible components of group d) are preferably ($C_3$–$C_{24}$)-vinyl esters, in particular vinyl acetate and vinyl ($C_8$–$C_{12}$)-carboxylate, styrene, vinyltoluene, acrylonitrile, methacrylonitrile, allyl alcohol, ($C_4$–$C_{22}$)-allyl ethers, ethylenically unsaturated dicarboxylic acid di-($C_1$–$C_{22}$)-alkyl esters, preferably dibutyl maleate, and ethylenically unsaturated sulfonic acids or sulfonic acid derivatives, preferably vinylsulfonic acid or alkali metal salts thereof.

Possible components of group c) are, preferably, methacrylic acid ($C_1$–$C_8$)-alkyl esters and/or acrylic acid ($C_1$–$C_8$)-alkyl esters, in particular the methyl and n-butyl esters. If ethyl acrylate is used, the emulsion copolymerization is carried out in at least two stages. In this case, a comonomer mixture which contains the total amount of comonomeric ethyl acrylate is employed in the first stage, while comonomer mixtures without ethyl acrylate are employed in the second stage and if appropriate further stages. Such a procedure surprisingly means that the resulting copolymer dispersion is largely free from residual monomeric ethyl acrylate and thus largely free from the unpleasant smell thereof.

The content of the amount of ethyl acrylate-free comonomer to be used in the second stage and if appropriate further stages of the emulsion copolymerization here is preferably in total at least 4% by weight, in particular in total at least 10% by weight, based on the total amount of all the comonomers employed.

Possible components of group b) are, preferably, methacrylic acid, acrylic acid, crotonic acid, maleic acid mono-($C_1$–$C_8$)-alkyl esters, maleic acid, fumaric acid, itaconic acid and if appropriate maleic anhydride, where, if appropriate, monomer units of maleic anhydride contained in the resulting copolymer are initially to be converted hydrolytically into maleic acid units or maleic acid half-ester units for the rheology-active salt formation. Methacyrlic acid and acrylic acid are particularly preferred.

According to the invention, the emulsion copolymerization can be carried out by customary methods. The customary anionic and/or nonionic emulsifiers can be employed here for emulsification of the monomers and stabilization of the resulting lattices.

The following aspects, inter alia, are to be remembered when choosing the nature and ratios of amounts of comonomers (a) to (g). The use of the unsaturated carboxylic acids mentioned as component (b) in the amounts according to the invention helps to ensure the easy dispersibility of the copolymers according to the invention in an aqueous dispersion. In the partly or completely neutralized form, component (b) furthermore decisively contributes, inter alia, toward achievement of the water-solubility or aqueous-colloidal dispersibility of the copolymer salts according to the invention, and in particular toward the thickener action thereof in aqueous systems.

It should furthermore be remembered that copolymerization of the particular comonomers used with one another must be possible in principle, and that it also actually takes place. In the simplest case, this can be estimated with the aid of the copolymerization parameters or the Q and e values (cf., for example, B. Brandrup, Immergut, Polymer Handbook, 2nd ed. (1975), John Wiley & Sons, New York). Under certain circumstances, when choosing certain comonomers (a)–(g), the monomer mixture ratio must be chosen according to how a copolymerization and simultaneous grafting reaction onto components a) and $a_1$) are possible by varying the synthesis process and, inter alia, specifically the manner of the monomer metering. Thus, under certain circumstances, if appropriate, copolymerizations can be forced by initially introducing one or more monomer components into the reaction vessel and metering in the other monomer or the other monomer mixture only in the course of the polymerization.

In the case of emulsion polymerization, it can be of decisive importance in this connection whether the monomer is metered in by itself or as an aqueous emulsion. The same also applies to the nature of the addition of emulsifier. Differences can be observed here with respect to particle size, particle size distribution, stability of the copolymer dispersion and the extent of the grafting reactions, for example depending on whether the emulsifier is initially introduced or whether it is metered in during the copolymerization.

Preferred anionic emulsifiers in the preparation of anionic emulsion copolymers are, for example, surface-active alkyl sulfates, alkylsulfonates, alkylaryl sulfates, alkylarylsulfonates and alkali metal and/or ammonium salts of alkyl or alkylaryl mono or polyglycol ether-sulfates.

Preferred nonionic emulsifiers are, for example, surface-active oxyethylated fatty alcohols or oxyethylated alkylphenols. The copolymer content in the aqueous copolymer dispersions according to the invention prepared by emulsion copolymerization is preferably 10 to 50% by weight, in particular 20 to 40% by weight.

During the emulsion copolymerization, it can also be of considerable importance whether the monomers are added to or metered into the copolymerization reaction as such or in aqueous emulsion form. The nature of the addition of the emulsifier furthermore has a similar significant effect. Thus, depending on whether the emulsifier is initially introduced in the aqueous phase or metered in during the copolymerization, great differences occur in respect of the particle size of the copolymers, the particle size distribution and the stability of the copolymer dispersions.

Possible components of group a) are, preferably, water-soluble polyvinyl alcohols (PVA) having molecular weights of between about 2000 and about 250,000, in particular about 10,000 to 100,000, such as are obtained, and can be partly or completely hydrolyzed, by alcoholysis or hydrolysis of polyvinyl esters, preferably of polyvinyl acetates. Completely hydrolyzed polyvinyl alcohols are preferred, preferably those in the lower to medium molecular weight range. Partly hydrolyzed PVAs are those in which between 70 and 95 mol % of the original vinyl ester units are hydrolyzed to vinyl alcohol units, and completely hydrolyzed PVAs are those having degrees of hydrolysis of 95 to 100 mol %. PVAs having degrees of hydrolysis of 70 to 100 mol %, 4% strength by weight aqueous solutions of which have viscosities at 20° C. of 3 to 66 mPas, in particular 2 to 10 mPas, measured in a Höppler viscometer in accordance with DIN 53015, are particularly preferred. The components of group a) are particularly preferred.

It is essential to the invention that the total amounts of components from groups a) or $a_1$) are initially introduced as a solution in the aqueous phase in the emulsion copolymerization, or if appropriate are also in part added in aqueous solution to the reactive polymerization mixture during the polymerization. If, instead, aqueous solutions of components a) or $a_1$) are stirred into comparable copolymer dispersions, which have been prepared without components a) or $a_1$), only when the copolymerization reaction has ended, products which are according to the invention and have an undesirable property profile are obtained, as the results of Comparison Examples 5 and 6 show. It can be seen from these that the components a) or $a_1$) dissolved in the aqueous phase of the polymerization mixture undergo grafting reactions in the course of the copolymerization reaction, polymeric side chain molecular portions being grafted onto them, whereby they are incorporated at least partly or if appropriate completely via main valency bonds into the molecular structures of the resulting copolymers. Such grafting reactions preferably occur with PVA and polyvinylpyrrolidone (PVP), and contribute decisively to the unexpectedly advantageous properties of the resulting copolymer dispersions according to the invention during later neutralization of their acid monomer units and to the associated thickener action in aqueous systems. During neutralization of the copolymer dispersions in the acid form according to the invention, above all none of the feared immediate gel formations and crosslinking phenomena occur, but, surprisingly, a smooth and rapid transition into the water-soluble salt forms take place, the desired thickener action and the specific rheology-modifying properties being developed.

Possible components of group $a_1$) are, preferably, water-soluble polyvinylpyrrolidones (PVP), in particular those having K values (according to Fikentscher) of 10 to 100, preferably 20 to 40, determined from viscosity measurements in aqueous solutions.

The copolymers according to the invention have surprisingly high thickener capacities in their partly and/or completely neutralized form in aqueous systems. Their property of developing high viscosities in an aqueous medium both in the low and in the high shear range is particularly advantageous and surprising, which renders them particularly suitable, inter alia, for the preparation of non-drip paints. Another important advantage is that by suitable choice of monomers it is possible to prepare copolymers according to the invention which are resistant to hydrolysis both in the acid and in the alkaline pH range. The advantageous spectrum of properties of the copolymers according to the invention allows their use as thickeners in more economical use amounts than in the case of the comparable use of comparable copolymers which indeed likewise contain methacrylic acid units and acrylic ester units but contain no constituents comprising grafted PVA or grafted PVP in order to impart certain advantageous rheological properties to aqueous systems.

The activity of copolymers according to the invention as thickeners for aqueous systems results, preferably, in their partly or completely neutralized form, neutralization of their carboxyl groups taking place by addition of inorganic or organic bases in each case according to the stoichiometry. By the neutralization, the copolymers according to the invention which are in general water-soluble in their non-neutralized form are converted into a water-soluble or a colloidally water-soluble or water-dispersible salt form, in which they display their thickener action in aqueous systems and can impart to these systems specific and stable rheological properties. The alkali metal, ammonium and morpholine salts or, in the case of partial neutralization, the corresponding partial salts are particularly preferred.

The copolymers according to the invention are preferably and particularly advantageously employed as thickeners for aqueous systems by admixing them in their non-neutralized acid form as a low-viscosity aqueous copolymer dispersion to the aqueous system to be thickened and then partly or completely neutralizing, and if appropriate rendering slightly alkaline, the resulting mixture, including all the auxiliaries, additives, pigments, paint constituents and the like which are co-used if appropriate and must be stable at the pH values to be established, by addition of bases such that they can develop their thickener action and rheology-modifying action immediately. The preferred pH range for neutralization with bases is pH 5 to 10.5, preferably 8 to 9.5.

The non-neutralized copolymers are particularly preferably admixed to the aqueous systems to be thickened in the form of aqueous copolymer dispersions or, if appropriate, advantageously also as redispersible dry powders such as are obtainable, preferably, from the copolymer dispersions on which they are based by spray drying.

The spray drying of copolymer dispersions according to the invention in their acid form is preferred on those dispersions in which the copolymers have a high glass transition temperature ($T_G$), preferably of >40° C., so that the spray-dried powders cannot stick together under the spray drying conditions. Dispersions of copolymers of low $T_G$, such as, for example, those based on ethyl acrylate/methacrylic acid, the $T_G$ of which can be, for example, in the region of <−40° C., can therefore advantageously be converted into a non-sticking powder form by spray drying of their aqueous solutions only after prior conversion into a water-soluble salt form.

The minimum film-forming temperature (MFT) of copolymer dispersions according to the invention in their acid form is known to depend on the $T_G$ of the copolymers, and increases as the carboxyl group content of the copolymers increases. Thus, for example, in the examples described below, the MFT of the copolymer dispersions is without exception >44° C. Since film formation is not necessary for use according to the invention of the dispersions as thickening agent in aqueous systems with conversion of the copolymers into a water-soluble salt form, the MFT of the dispersions according to the invention is of no further importance.

A preferred field of use for the copolymers according to the invention is their use as thickeners for thickening and for adjusting the viscosity of aqueous solutions, aqueous dispersions and disperse aqueous systems, preferably, for example, aqueous emulsion paints, emulsion gloss paints, emulsion scumbles, textile printing pastes, paper printing pastes, biodical active compound solutions and active compound dispersions, in particular for plant protection and for pest control, liquid fertilizers, emulsion cleaners, pickling pastes, defrosting agents, cosmetic formulations, cement, lime and gypsum plaster mortars, concrete and drilling flushing agents for deep bores.

In aqueous emulsion paints and aqueous emulsion gloss paints, the use of copolymers according to the invention, for example, leads particularly advantageously to the development of the rheological properties desired by the user, such as a good high-shear viscosity and good low-shear viscosity, the latter property being of importance for non-drip paint formulations. Good high-shear viscosity here is understood as meaning values, determined on, for example, 5% strength by weight aqueous thickener solutions, of between 0.01 and 1 Pas at a shear rate of D=10,000 s$^{-1}$, and good low-shear viscosity values are understood as meaning between 0.1 and 100 Pas at D=0.1 s$^{-1}$.

The amounts used of the copolymers according to the invention are not critical. For use as a thickener, however, they are preferably in the range from 0.01 to 5% by weight of copolymer, based on the aqueous system to be thickened.

The invention is illustrated in more detail by the following examples.

EXAMPLES 1 TO 12

The copolymer preparation of Examples 1 to 12 is carried out in accordance with the method described below, the nature and amounts of the particular comonomers and protective colloids employed as starting components and the solids content and stability of the particular resulting aqueous dispersions containing the copolymers in their salt form being summarized in Table 1. The amount of monomer b) in Examples 1, 3, 5, 7 and 11 was 24.72% by weight and in Examples 2, 4, 6, 8 and 12 was 24.37% by weight.

In each case the amounts of desalinated water (D water) shown in Table 1 are initially introduced into a stirred apparatus comprising a 2 l three-necked flask with a stirrer, reflux condenser, internal thermometer and metering attachment, these are mixed with 28 g of a 50% strength by weight aqueous solution of a sodium alkylaryl polyglycol ether-sulfate (®Hostapal BV, manufacturer: Hoechst AG) as an anionic emulsifier, the amount of the particular protective colloid stated in Table 1 is added to the mixture and the mixture is heated to 80° C., whereupon the protective colloid dissolves. A portion of 10 ml of an initiator solution comprising 0.49 g of ammonium persulfate in 50 g of D water and a portion of 50 g of a monomer mixture of the particular amounts of comonomers stated in Table 1 are added to this solution at 80° C. and the mixture is stirred at 80° C. for 30 minutes. Thereafter, the remainder of the particular monomer mixture and the remainder of the initiator solution are metered in uniformly in the course of 2 hours at 80° C., while continuing to stir. The reaction mixture is then stirred at 80° C. for a further hour and subsequently brought to room temperature, in each case an aqueous copolymer dispersion having the solids content shown in Table 1 and in which the copolymer is present in its acid, non-neutralized form being obtained.

For characterization of the thickening action, in each case the viscosity of a 5% strength by weight aqueous NH$_4$-copolymer salt solution is determined at 23° C. by the ISO/DIS 2555 method, and the result is stated as the viscosity number in [Pas] in Table 1. Increasing numerical values here denote an increasing thickening action.

COMPARISON EXAMPLES 1 TO 4

Comparison Examples 1 and 2 are carried out analogously to Examples 7 and 8 and Comparison Examples 3 and 4 are carried out analogously to Examples 11 and 12, in each case with modification that in the comparison examples, in each case 302 g of MMA are employed instead of 263 g of MMA (Examples 7 and 8, and 11 and 12), and in each case 49 g of MAA are employed instead of 88 g of MAA. The amounts of the starting components employed are summarized in Table 1, as are the solids content and the stability of the aqueous dispersions obtained in the comparison examples. As the values show, no stable aqueous copolymer dispersion is obtained in any of Comparison Examples 1 to 4, but the reaction mixtures already coagulate in their acid form in the course of the polymerization reaction.

COMPARISON EXAMPLES 5 AND 6

Examples 1 and 2 are repeated with the modification that the protective colloid according to the invention is not added to the aqueous initial mixture and the emulsion copolymerization is carried out without the presence of the protective colloid. When the copolymerization has ended, the stated amount of protective colloid, after it has been dissolved in the water content by which the aqueous initial mixture in the emulsion copolymerization has been reduced, is mixed with the particular resulting protective colloid-free copolymer dispersion at room temperature, while stirring, in each case a stable aqueous protective colloid-containing copolymer dispersion which is not according to the invention being obtained, the composition, solids content and viscosity number of which are shown in Table 1. The 5% strength by weight aqueous NH$_4$-copolymer salt solutions of Comparison Examples 5 and 6 show a surprisingly low thickening action compared with that of Examples 1 and 2.

TABLE 1

Starting components and solids content of the resulting copolymer dispersions of Examples 1 to 12 and Comparison Examples 1 to 6 and the viscosity of 5% strength by weight aqueous NH$_4$-copolymer salt solutons for characterization of the thickening action

| Example No. | Protective colloid in the initial mixture Type | Protective colloid in the initial mixture Amount[*2] | Monomer mixture [g] of MMA[*3] [g] | Monomer mixture [g] of MMA[*4] [g] | Monomer mixture [g] of CS[*5] [g] | Water in the initial mixture [g] | Solids content [% by weight][*7] and stability of the resulting dispersions | Viscosity number[*8] [Pas] |
|---|---|---|---|---|---|---|---|---|
| 1 | PVA[1] 3-98 | 5 | 263 | 88 | — | 777 | 30.7 stable | 4.50 |
| 2 | PVA[1] 3-98 | 10 | 263 | 88 | — | 815 | 31.0 stable | 2.77 |
| 3 | PVA[1] 4-88 | 5 | 263 | 88 | — | 777 | 31.0 stable | |
| 4 | PVA[1] 4-88 | 10 | 263 | 88 | — | 815 | 31.0 stable | |
| 5 | PVA[1] 3-83 | 5 | 263 | 88 | — | 777 | 31.0 stable | |
| 6 | PVA[1] 3-83 | 10 | 263 | 88 | — | 815 | 31.0 stable | |
| 7 | PVA[1] 4-80 | 5 | 263 | 88 | — | 777 | 30.8 stable | |

TABLE 1-continued

Starting components and solids content of the resulting copolymer dispersions of Examples 1 to 12 and Comparison Examples 1 to 6 and the viscosity of 5% strength by weight aqueous NH$_4$-copolymer salt solutons for characterization of the thickening action

| Example No. | Protective colloid in the initial mixture | | Monomer mixture [g] of | | | Water in the initial mixture | Solids content [% by weight]*7 and stability of the resulting | Viscosity number*8 |
|---|---|---|---|---|---|---|---|---|
| | Type | Amount*2 | MMA*3 [g] | MMA*4 [g] | CS*5 [g] | [g] | dispersions | [Pas] |
| 8 | PVA$^{1)}$ 4-80 | 10 | 263 | 88 | — | 815 | 31.0 stable | |
| 9 | PVA$^{1)}$ 3-98 | 5 | 245 | 88 | 18 | 777 | 31.0 stable | |
| 10 | PVA$^{1)}$ 3-98 | 10 | 245 | 88 | 18 | 815 | 30.5 stable | |
| 11 | PVP$^{6)}$ K 30 | 5 | 263 | 88 | — | 777 | 31.0 stable | |
| 12 | PVP$^{6)}$ K 30 | 10 | 263 | 88 | — | 815 | 31.0 stable | |
| Comp. Example 1 | PVA$^{1)}$ 4-80 | 5 | 302 | 49 | — | 777 | <30 coagulates | |
| Comp. Example 2 | PVA$^{1)}$ 4-80 | 10 | 302 | 49 | — | 815 | <30 coagulates | |
| Comp. Example 3 | PVP$^{6)}$ K 30 | 5 | 302 | 49 | — | 777 | <30 coagulates | |
| Comp. Example 4 | PVP$^{6)}$ K 30 | 10 | 302 | 49 | — | 815 | <30 coagulates | |
| | Addition of protective colloid after the emulsion copolymerization | | | | | | | |
| Comp. Example 5 | PVA$^{1)}$ 3-98 | 5 | 263 | 88 | — | 739 | 30.7 stable | 0.06 |
| Comp. Example 6 | PVA$^{1)}$ 3-98 | 10 | 263 | 88 | — | 739 | 30.7 stable | 0.06 |

*$^1$PVA: polyvinyl alcohols, the number before the hyphen indicating the viscosity (mPa · s) according to DIN 53015 of a 4% strength by weight aqueous solution at 20° C. The number after the hyphen represents the degree of hydrolysis in mol %.
*$^2$% by weight, based on the total amount of monomers
*$^3$MMA: methyl methacrylate
*$^4$MAA: methacrylic acid
*$^5$(copolymerizable surfactant): crotonic acid ester of an oxyethylated C$_{16}$–C$_{18}$ oxo alcohol with 25 ethylene oxide units
*$^6$commercially available ®Luviskol K 30 (manufacturer: BASF AG): polyvinylpyrrolidone having a K value of 30 (according to Fikentscher), measured in aqueous solution
*$^7$% by weight, based on the dispersion
*$^8$measured in an RVT Brookfield viscometer by the ISO/DIS 2555 method at 23° C. with spindle 4 at 20 revolutions per minute on 5% strength by weight aqueous NH$_4$-copolymer salt solutions at pH 8.5 with prior storage of the 5% strength by weight measurement solutions at 23° C. for one day. The viscosity numbers determined are stated in [Pas].

What is claimed is:

1. A copolymer based on ethylenically unsaturated monomers which can undergo free radical copolymerization, the macromolecules of which contain monomer units carrying carboxyl groups prepared by emulsion copolymerization initiated by free radicals in the presence of water-soluble polyvinyl alcohol (PVAL) or other water-soluble organic protective colloids, and are in an aqueous dispersion form having a solids content of 10 to 50% by weight or in dried redispersible powder form, and optionally some or all of the carboxyl groups of the copolymer are in a water-soluble salt form, having a thickening and rheology-modifying action in aqueous media, wherein the copolymer comprises, in each case based on the copolymer, a) 5 to 15% by weight of constituents comprising water-soluble polyvinyl alcohol (PVA) grafted during copolymer formation, or mixtures of at least 50% by weight based on the mixture, of water-soluble PVA grafted during copolymer formation and at least one of the components selected from the group consisting of:
  1) a water-soluble cellulose,
  2) water-soluble polymers of N-vinylamide compounds optionally grafted during copolymer formation,
  3) water-soluble homopolymeric, copolymeric or block copolymeric polyalkylene oxides and
  4) water-soluble polyvinyl alcohols modified by isocyanate compounds or acetoacetoxylated, or a$_1$) instead of component a), 5 to 15% by weight of constituents comprising water-soluble polyvinyl-pyrrolidone (PVP) grafted during copolymer formation, and
b) 24 to 64% by weight of monomer units comprising ethylenically unsaturated monomers carrying carboxyl groups, and
c) 30 to 69% by weight of monomer units comprising methacrylic acid esters or acrylic acid esters of aliphatic alcohols of 1 to 22 carbon atoms, and
d) 0.1 to 20% by weight of monomer units comprising ethylenically unsaturated comonomers which differ from components b) and c) and
e) 0.1 to 15% by weight of monomer units comprising ethylenically unsaturated surface-active comonomers, and
f) 0.01 to 2% by weight of monomer units comprising polyethylenically unsaturated comonomers, and
g) 0.1 to 1.5% by weight of molecular weight regulators and the copolymer, in its acid form or its partial salt form, is in the form of an aqueous dispersion or a dried redispersible powder, or when, in its water-soluble partial or complete salt form, is in the form of an aqueous solution or an aqueous gel or a dried water-soluble powder.

2. A copolymer of claim 1, which is in a water-soluble or colloidally dispersible in water form and is partly or completely neutralized with an alkali metal base, alkaline earth metal base or ammonium base.

3. A copolymer of claim 1 wherein 1) the water-soluble cellulose is selected from the group consisting of hydroxy-ethyl cellulose, carboxymethyl cellulose, carboxymethylhydroxy cellulose and methyl hydroxy cellulose, 2) the water-soluble polymer of N-vinylamide compound is polyvinylpyrrolidone, 3) the water-soluble polymeric polyalkylene oxides are at least one member selected from the group consisting of ethylene oxide and propylene oxide.

4. A copolymer of claim 1 wherein component d) is selected from the group consisting of vinyl esters of 3 to 24 carbon atoms, vinyl aromatics, ethylenically unsaturated nitriles, ($C_1$ to $C_{22}$)-alkyl esters of ethylenically unsaturated mono carboxylic acids and dicarboxylic acids and ethylenically unsaturated sulfonic acids and sulfonic acid derivatives, the component e) is a surface active crotonic acid ester, the component f) is selected from the group consisting of divinylbenzene, diallyl phthalate, butanediol diacrylate and butanediol dimethacrylate and the component g) is selected from the group consisting of dodecylmercaptan, thiophenol derivatives, tetrakis mercapto acetyl pentaerythritol, carbon tetrachloride and bromo tricholormethane.

5. A copolymer of claim 2 wherein the neutralization is effected with a sodium or potassium base, ammonia or morpholine.

6. An aqueous dispersion thickened with a copolymer of claim 1.

7. A method of thickening an aqueous dispersion comprising forming an aqueous dispersion of a copolymer of claim 1 in its acid form in an amount sufficient to thicken the aqueous dispersion and adding a base to the resulting mixture to at least partially neutralize the acid form of the copolymer to form a salt thereof which is soluble or colloidally dispersible or gel forming in water.

8. A composition selected from the group consisting of emulsion paints, emulsion gloss paints, emulsion scumbles, textile printing pastes and paper printing pastes, biocidal active compound dispersions for plant protection and pest control, liquid fertilizers, emulsion cleaners, pickling pastes, defrosting agents, cosmetic formulations, cement, lime and gypsum plaster mortars, concrete and drilling flushing agents for deep bores thickened with a copolymer of claim 1.

9. A copolymer of claim 1 wherein the amount of component b) is 24.37% by weight.

10. A copolymer of claim 1 wherein the amount of component b) is about 25% by weight.

11. A copolymer based on ethylenically unsaturated monomers which can undergo free radical copolymerization, the macromolecules of which contain monomer units carrying carboxyl groups prepared by emulsion copolymerization initiated by free radicals in the presence of water-soluble polyvinyl alcohol (PVAL) or other water-soluble organic protective colloids, and anionic emulsifiers selected from the group consisting of alkyl sulfates, alkyl sulfonates, alkylaryl sulfonates, alkali metal salts and ammonium salts of alkyl and alkylaryl mono and polyglycol ether sulfates or nonionic emulsifiers selected from the group consisting of oxyethylated fatty alcohols and oxyethylated alkylphenols and are in an aqueous dispersion form having a solids content of 10 to 50% by weight or in dried redispersible powder form, and optionally some or all of the carboxyl groups of the copolymer are in a water-soluble salt form, having a thickening and rheology-modifying action in aqueous media, wherein the copolymer comprises, in each case based on the copolymer, a) 5 to 15% by weight of constituents comprising water-soluble polyvinyl (PVA) grafted during copolymer formation, or mixtures of at least 50% by weight based on the mixture, of water-soluble PVA grafted during copolymer formation and at lest one of the components selected from the group consisting of:

1) a water-soluble cellulose,
2) water-soluble polymers of N-vinylamide compounds optionally grafted during copolymer formation,
3) water-soluble homopolymeric, copolymeric or block copolymeric polyalkylene oxides and
4) water-soluble polyvinyl alcohols modified by isocyanate compounds or acetoacetoxylated, or $a_1$) instead of component a), 5 to 15% by weight of constituents comprising water-soluble polyvinyl-pyrrolidone (PVP) grafted during copolymer formation, and b) 24 to 64% by weight of monomer units comprising ethylenically unsaturated monomers carrying carboxyl groups, and c) 30 to 69% by weight of monomer units comprising methacrylic acid esters or acrylic acid esters of aliphatic alcohols of 1 to 22 carbon atoms, and d) 0.1 to 20% by weight of monomer units comprising ethylenically unsaturated comonomers which differ from components b) and c) and e) 0.1 to 15% by weight of monomer units comprising ethylenically unsaturated surface-active comonomers, and f) 0.01 to 2% by weight of monomer units comprising polyethylenically unsaturated comonomers, and g) 0.1 to 1.5% by weight of molecular weight regulators and the copolymer, in its acid form or its partial salt form, is in the form of an aqueous dispersion or a dried redispersible powder, or when, in its water-soluble partial or complete salt form, is in the form of an aqueous solution or an aqueous gel or a dried water-soluble powder.

12. A process for the preparation of a copolymer of claim 1 comprising free radical copolymerization of ethylenically unsaturated copolymerizable compounds in an aqueous medium at a temperature of 5° to 100° C., co-using water-soluble polyvinyl alcohol (PVA) or other water-soluble organic protective colloids dissolved in the aqueous medium initially introduced into the reaction vessel in the presence of polymerization initiators which form the free radicals, emulsifiers, further protective colloids and molecular weight regulators, and optionally subsequent at least partial neutralization of the free acid groups of the copolymer and isolation of the copolymer as aqueous dispersion or as aqueous solution, or after removal of the water content, as water-dispersible or water-soluble powder, wherein a) to g) or $a_1$) to g) are employed in the following amounts based on their total amount without the water content, a) 5 to 15% by weight of constituents comprising water-soluble polyvinyl (PVA) grafted during copolymer formation, or mixtures of at least 50% by weight based on the mixture, of water-soluble PVA grafted during copolymer formation and at least one of the components selected from the group consisting of:

1) a water-soluble cellulose,
2) water-soluble polymers of N-vinylamide compounds optionally grafted during copolymer formation,
3) water-soluble homopolymeric, copolymeric or block copolymeric polyalkylene oxides and
4) water-soluble polyvinyl alcohols modified by isocyanate compounds or acetoacetoxylated, or $a_1$) instead of component a), 5 to 15% by weight of constituents comprising water-soluble polyvinyl-pyrrolidone (PVP) grafted during copolymer formation, and b) 24 to 64% by weight of monomer units comprising ethylenically unsaturated monomers carrying carboxyl groups, and c) 30 to 69% by weight of monomer units comprising methacrylic acid esters or acrylic acid esters of aliphatic alcohols of 1 to 22 carbon atoms, and d) 0.1 to 20% by weight of monomer units comprising ethylenically unsaturated comonomers which differ from components b) and c) and e) 0.1 to 15% by weight of monomer units comprising ethylenically unsaturated surface-active comonomers, and f) 0.01 to 2% by weight of monomer units comprising polyethylenically unsaturated comonomers, and g) 0.1 to 1.5% by weight of molecular weight regulators, wherein the aqueous medium a) or $a_1$) containing PVA or PVP, to which anionic and optionally nonionic emulsifiers and further protective colloids and polymerization initiators which form free radicals furthermore are added, is initially introduced into a stirred reactor at the polymerization temperature, components b) to g) being metered in separately or as a mixture or as an aqueous emulsion in the required amounts according to the progress of the polymerization and optionally in several successive stages, optionally together with further portions of the polymerization initiators and optionally further emulsifier portions, it also being possible for water-soluble starting monomers to be at least partly dissolved in the aqueous initial mixture, the copolymerization reaction is brought to completion to form an aqueous copolymer dispersion and the copolymer is isolated in its acid form as an aqueous dispersion having a solids content of 10 to 50% by weight, based on the aqueous dispersion, or optionally the dispersion is converted into a dry redispersible copolymer powder by removal of water or optionally the dispersion is at least partly neutralized by addition of basic compounds, and optionally is converted into dry, partly or completely neutralized water-soluble or colloidally water-soluble copolymer powders by removal of water.

13. A copolymer based on ethylenically unsaturated monomers which can undergo free radical copolymerization, the macromolecules of which contain monomer units carrying carboxyl groups prepared by emulsion copolymerization initiated by free radicals in the presence of water-soluble polyvinyl alcohol (PVAL) or other water-soluble organic protective colloids, and are in an aqueous dispersion form having a solids content of 10 to 50% by weight or in dried redisperible powder form, and optionally some or all of the carboxyl groups of the copolymer are a water-soluble salt form, having a thickening and rheology-modifying action in aqueous media, wherein the copolymer consisting essentially of, in each case based on the copolymer, a) 5 to 15% by weight of constituents comprising water-soluble polyvinyl alcohol (PVA) grafted during copolymer formation, or mixtures of at least 50% by weight based on the mixture, of water-soluble PVA grafted during copolymer formation, and at least one of the components selected from the group consisting of:

1) a water soluble cellulose,
2) water-soluble polymers of N-vinylamide compounds optionally grated during copolymer formation,
3) water-soluble homopolymeric, copolymeric or block copolymeric polyalkylene oxides and
4) water-soluble polyvinyl alcohols modified by isocyanate compounds or acetoacetoxylated, or $a_1$) instead of component a), 5 to 15% by weight of constituents comprising water-soluble polyvinyl-pyrrolidone (PVP) grafted during copolymer formation, and b) 24 to 64% by weight of monomer units comprising ethylenically unsaturated monomers carrying carboxyl groups, and c) 30 to 69% by weight of monomer units comprising methacrylic acid esters or acrylic acid esters of aliphatic alcohols of 1 to 22 carbon atoms, and d) 0.1 to 20% by weight of monomer units comprising ethylenically unsaturated comonomers which differ from components b) and c) and e) 0.1 to 15% by weight of monomer units comprising ethylenically unsaturated surface-active comonomers, and f) 0.01 to 2% by weight of monomer units comprising polyethylenically unsaturated comonomers, and g) 0.1 to 1.5% by weight of molecular weight regulators and the copolymer, in its acid form or its partial salt form, is in the form of an aqueous dispersion or a dried redispersible powder, or when, in its water-soluble partial or complete salt form, is in the form of an aqueous solution or an aqueous gel or a dried water-soluble powder.

* * * * *